(12) United States Patent
Lin et al.

(10) Patent No.: US 7,391,412 B2
(45) Date of Patent: Jun. 24, 2008

(54) OPTICAL MOUSE WITH SHADE COMPENSATION AND ITS SHADE COMPENSATION METHOD

(75) Inventors: Chia-Chun Lin, Nantou (TW); Yu-Lin Chen, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 571 days.

(21) Appl. No.: 11/062,800

(22) Filed: Feb. 23, 2005

(65) Prior Publication Data
US 2005/0253812 A1    Nov. 17, 2005

(30) Foreign Application Priority Data
May 12, 2004    (TW) .............................. 93113316 A (51) Int. Cl.
*G09G 5/08*    (2006.01)

(52) U.S. Cl. ....................................... 345/163; 345/166

(58) Field of Classification Search ................ 345/163, 345/166, 158, 362
See application file for complete search history.

(56) References Cited

U.S. PATENT DOCUMENTS

| | | | | |
|---|---|---|---|---|
| 4,521,772 A * | 6/1985 | Lyon | ........................... | 345/166 |
| 5,644,139 A * | 7/1997 | Allen et al. | .................. | 250/557 |
| 6,303,924 B1 * | 10/2001 | Adan et al. | .................. | 250/221 |
| 7,161,585 B2 * | 1/2007 | Lauffenburger et al. | ..... | 345/166 |
| 2003/0034959 A1 * | 2/2003 | Davis et al. | .................. | 345/166 |

* cited by examiner

*Primary Examiner*—Chanh D. Nguyen
*Assistant Examiner*—Pegeman Karimi
(74) *Attorney, Agent, or Firm*—Bacon & Thomas, PLLC (57) ABSTRACT

An optical mouse, with shade compensation, has a light source, a sensor and a controller. The light source illuminates a sampling plane of a mouse. The sensor consists of a 2-dimensional array of sensing elements to capture an image from the sampling plane and temporarily store the image into a 2-dimensional array of pixels, each having a pixel value. The controller is connected to the sensor for adjusting the pixel values according to a predetermined table, thereby achieving a shade compensation for the sensing elements.

23 Claims, 8 Drawing Sheets

FIG. 1

| 46 | 47 | 48 | 48 | 48 | 47 | 47 | 47 | 46 | 46 | 46 | 44 | 43 | 41 | 40 | 37 |
|---|---|---|---|---|---|---|---|---|---|---|---|---|---|---|---|
| 47 | 49 | 49 | 49 | 49 | 48 | 48 | 49 | 48 | 48 | 47 | 46 | 45 | 43 | 41 | 39 |
| 49 | 50 | 51 | 51 | 50 | 51 | 51 | 50 | 50 | 49 | 48 | 48 | 46 | 44 | 42 | 40 |
| 51 | 52 | 46 | (37) | 53 | 52 | 52 | 51 | 50 | 50 | 49 | 49 | 47 | 46 | 44 | 41 |
| 51 | 52 | 50 | (32) | 41 | 54 | 52 | 52 | 52 | 51 | 49 | 49 | 48 | 46 | 45 | 43 |
| 52 | 53 | 54 | 50 | 53 | 54 | 53 | 53 | 52 | 52 | 50 | 49 | 48 | 47 | 45 | 43 |
| 52 | 53 | 53 | 54 | 54 | 54 | 54 | 54 | 53 | 52 | 51 | 50 | 49 | 48 | 45 | 44 |
| 52 | 53 | 54 | 54 | 55 | 54 | 54 | 54 | 53 | 53 | 51 | 50 | 49 | 48 | 47 | 44 |
| 51 | 53 | 54 | 54 | 55 | 56 | 53 | 53 | 53 | 53 | 50 | 49 | 49 | 46 | 45 | |
| 51 | 53 | 54 | 54 | 55 | 55 | 53 | 54 | 53 | 53 | 52 | 50 | 50 | 49 | 46 | 45 |
| 52 | 53 | 54 | 54 | 54 | 54 | 53 | 54 | 53 | 52 | 51 | 51 | 49 | 49 | 46 | 45 |
| 51 | 53 | 54 | 54 | 54 | 54 | 54 | 53 | 53 | 52 | 51 | 51 | 49 | 48 | 46 | 45 |
| 51 | 52 | 52 | 52 | 54 | 54 | 54 | 53 | 53 | 52 | 52 | 50 | 49 | 48 | 45 | 44 |
| 49 | 51 | 51 | 53 | 53 | 54 | 54 | 53 | 52 | 51 | 51 | 50 | 47 | 45 | 43 | |
| 49 | 50 | 52 | 52 | 52 | 53 | 53 | 52 | 51 | 51 | 51 | 50 | 47 | 45 | 45 | 43 |
| 49 | 48 | 50 | 50 | 52 | 52 | 51 | 51 | 51 | 50 | 50 | 50 | 46 | 45 | 44 | 42 |

| 44 | 45 | 46 | 46 | 46 | 45 | 45 | 45 | 44 | 44 | 44 | 42 | 41 | 39 | 38 | 35 |
|----|----|----|----|----|----|----|----|----|----|----|----|----|----|----|----|
| 45 | 47 | 47 | 47 | 47 | 46 | 46 | 47 | 46 | 46 | 45 | 44 | 43 | 41 | 39 | 37 |
| 47 | 48 | 49 | 49 | 48 | 49 | 49 | 48 | 48 | 47 | 46 | 46 | 44 | 42 | 40 | 38 |
| 49 | 50 | 44 | 36 | 51 | 50 | 50 | 49 | 48 | 48 | 47 | 47 | 45 | 44 | 42 | 39 |
| 49 | 50 | 48 | 31 | 39 | 52 | 50 | 50 | 50 | 49 | 47 | 47 | 46 | 44 | 43 | 41 |
| 50 | 51 | 52 | 48 | 51 | 52 | 51 | 51 | 51 | 50 | 50 | 48 | 47 | 46 | 45 | 43 | 41 |
| 50 | 51 | 51 | 52 | 52 | 52 | 52 | 52 | 51 | 50 | 49 | 48 | 47 | 46 | 43 | 42 |
| 50 | 51 | 52 | 52 | 53 | 52 | 52 | 52 | 51 | 51 | 49 | 49 | 47 | 46 | 45 | 42 |
| 49 | 51 | 52 | 52 | 53 | 54 | 51 | 51 | 51 | 51 | 51 | 48 | 47 | 47 | 44 | 43 |
| 49 | 51 | 52 | 52 | 53 | 53 | 51 | 52 | 51 | 51 | 50 | 48 | 48 | 47 | 44 | 43 |
| 50 | 51 | 52 | 52 | 52 | 52 | 51 | 52 | 51 | 50 | 49 | 49 | 47 | 47 | 44 | 43 |
| 49 | 51 | 52 | 52 | 52 | 52 | 52 | 51 | 51 | 50 | 49 | 49 | 47 | 46 | 44 | 43 |
| 49 | 50 | 50 | 50 | 52 | 52 | 52 | 51 | 51 | 50 | 50 | 48 | 47 | 46 | 43 | 42 |
| 47 | 49 | 49 | 51 | 51 | 52 | 52 | 51 | 50 | 49 | 49 | 48 | 47 | 45 | 43 | 41 |
| 47 | 48 | 50 | 50 | 50 | 51 | 51 | 50 | 49 | 49 | 49 | 48 | 45 | 43 | 43 | 41 |
| 47 | 46 | 48 | 48 | 50 | 50 | 49 | 49 | 49 | 48 | 48 | 48 | 44 | 43 | 42 | 40 |

| | | | | | | | | | | | | | | | |
|---|---|---|---|---|---|---|---|---|---|---|---|---|---|---|---|
| 1.227 | 1.200 | 1.174 | 1.174 | 1.174 | 1.200 | 1.200 | 1.200 | 1.227 | 1.227 | 1.227 | 1.286 | 1.317 | 1.385 | 1.421 | 1.543 |
| 1.200 | 1.149 | 1.149 | 1.149 | 1.149 | 1.174 | 1.174 | 1.149 | 1.174 | 1.174 | 1.200 | 1.227 | 1.256 | 1.317 | 1.385 | 1.459 |
| 1.149 | 1.125 | 1.102 | 1.102 | 1.125 | 1.102 | 1.102 | 1.125 | 1.125 | 1.149 | 1.174 | 1.174 | 1.227 | 1.286 | 1.350 | 1.421 |
| 1.102 | 1.080 | 1.227 | 1.500 | 1.059 | 1.080 | 1.080 | 1.102 | 1.125 | 1.125 | 1.149 | 1.149 | 1.200 | 1.227 | 1.286 | 1.385 |
| 1.102 | 1.080 | 1.125 | 1.742 | 1.385 | 1.038 | 1.080 | 1.080 | 1.080 | 1.102 | 1.149 | 1.149 | 1.174 | 1.227 | 1.256 | 1.317 |
| 1.080 | 1.059 | 1.038 | 1.125 | 1.059 | 1.038 | 1.059 | 1.059 | 1.080 | 1.080 | 1.125 | 1.149 | 1.174 | 1.200 | 1.256 | 1.317 |
| 1.080 | 1.059 | 1.059 | 1.038 | 1.038 | 1.038 | 1.038 | 1.038 | 1.059 | 1.080 | 1.102 | 1.125 | 1.149 | 1.174 | 1.256 | 1.286 |
| 1.080 | 1.059 | 1.038 | 1.038 | 1.019 | 1.038 | 1.038 | 1.038 | 1.059 | 1.059 | 1.080 | 1.102 | 1.125 | 1.174 | 1.200 | 1.286 |
| 1.102 | 1.059 | 1.038 | 1.038 | 1.019 | 1.000 | 1.059 | 1.038 | 1.059 | 1.059 | 1.059 | 1.125 | 1.149 | 1.149 | 1.227 | 1.256 |
| 1.102 | 1.059 | 1.038 | 1.038 | 1.019 | 1.019 | 1.059 | 1.038 | 1.059 | 1.059 | 1.080 | 1.125 | 1.125 | 1.149 | 1.227 | 1.256 |
| 1.080 | 1.059 | 1.038 | 1.038 | 1.038 | 1.038 | 1.059 | 1.038 | 1.059 | 1.080 | 1.102 | 1.102 | 1.149 | 1.149 | 1.227 | 1.256 |
| 1.102 | 1.059 | 1.038 | 1.038 | 1.038 | 1.038 | 1.038 | 1.059 | 1.059 | 1.080 | 1.102 | 1.102 | 1.149 | 1.174 | 1.227 | 1.256 |
| 1.102 | 1.080 | 1.080 | 1.080 | 1.038 | 1.038 | 1.038 | 1.059 | 1.059 | 1.080 | 1.080 | 1.125 | 1.149 | 1.174 | 1.256 | 1.286 |
| 1.149 | 1.102 | 1.102 | 1.059 | 1.059 | 1.038 | 1.038 | 1.059 | 1.080 | 1.102 | 1.102 | 1.125 | 1.149 | 1.200 | 1.256 | 1.317 |
| 1.149 | 1.125 | 1.080 | 1.080 | 1.080 | 1.059 | 1.059 | 1.080 | 1.102 | 1.102 | 1.125 | 1.149 | 1.200 | 1.256 | 1.256 | 1.317 |
| 1.149 | 1.174 | 1.125 | 1.125 | 1.080 | 1.080 | 1.102 | 1.102 | 1.125 | 1.125 | 1.125 | 1.227 | 1.256 | 1.286 | 1.350 | — |

|    |    |    |    |    |    |    |    |    |    |    |    |    |    |
|----|----|----|----|----|----|----|----|----|----|----|----|----|----|
| 23 | 15 | 16 | 28 | 41 | 47 | 49 | 48 | 47 | 46 | 42 | 26 | 12 | 14 | 26 |
| 14 | 18 | 30 | 42 | 49 | 51 | 51 | 50 | 49 | 48 | 47 | 42 | 26 | 12 | 15 | 29 |
| 19 | 32 | 44 | 50 | 52 | 52 | 51 | 48 | 43 | 42 | 45 | 44 | 28 | 13 | 13 | 27 |
| 34 | 46 | 44 | 37 | 54 | 53 | 50 | 39 | 27 | 28 | 38 | 44 | 33 | 17 | 11 | 21 |
| 46 | 51 | 50 | 32 | 41 | 53 | 48 | 33 | 17 | 16 | 31 | 43 | 41 | 24 | 12 | 13 |
| 50 | 52 | 54 | 50 | 52 | 52 | 49 | 36 | 23 | 23 | 34 | 45 | 46 | 35 | 19 | 12 |
| 51 | 51 | 50 | 48 | 46 | 46 | 46 | 45 | 38 | 38 | 44 | 49 | 48 | 44 | 31 | 18 |
| 49 | 44 | 37 | 31 | 29 | 29 | 33 | 40 | 45 | 48 | 49 | 51 | 50 | 48 | 42 | 31 |
| 40 | 30 | 20 | 16 | 16 | 16 | 17 | 24 | 35 | 44 | 50 | 51 | 51 | 50 | 47 | 43 |
| 26 | 17 | 19 | 25 | 27 | 24 | 18 | 15 | 21 | 35 | 46 | 50 | 51 | 50 | 48 | 46 |
| 16 | 22 | 33 | 41 | 44 | 41 | 31 | 20 | 15 | 24 | 39 | 48 | 50 | 50 | 49 | 48 |
| 18 | 33 | 45 | 49 | 51 | 50 | 44 | 31 | 18 | 16 | 32 | 45 | 50 | 50 | 49 | 48 |
| 24 | 41 | 49 | 51 | 53 | 51 | 49 | 42 | 24 | 15 | 24 | 41 | 48 | 50 | 49 | 47 |
| 25 | 43 | 49 | 52 | 52 | 51 | 50 | 45 | 29 | 15 | 19 | 36 | 46 | 49 | 48 | 47 |
| 21 | 39 | 48 | 51 | 51 | 50 | 49 | 45 | 28 | 15 | 15 | 31 | 44 | 47 | 47 | 46 |
| 15 | 31 | 44 | 48 | 49 | 48 | 46 | 39 | 23 | 13 | 13 | 27 | 41 | 46 | 46 | 46 |

FIG. 6

| | | | | | | | | | | | | | | | |
|---|---|---|---|---|---|---|---|---|---|---|---|---|---|---|---|
| 28 | 18 | 18 | 32 | 48 | 56 | 58 | 58 | 58 | 57 | 56 | 54 | 34 | 16 | 19 | 40 |
| 16 | 20 | 34 | 48 | 56 | 59 | 59 | 57 | 57 | 56 | 56 | 51 | 32 | 15 | 20 | 42 |
| 21 | 36 | 48 | 55 | 58 | 57 | 56 | 54 | 48 | 48 | 52 | 51 | 34 | 16 | 17 | 38 |
| 37 | 49 | 54 | (55) | 57 | 57 | 54 | 42 | 30 | 31 | 43 | 50 | 39 | 20 | 14 | 29 |
| 50 | 55 | 56 | (55) | 56 | 55 | 51 | 35 | 18 | 17 | 35 | 49 | 48 | 29 | 15 | 17 |
| 54 | 55 | 56 | 56 | 55 | 54 | 51 | 38 | 24 | 24 | 38 | 51 | 54 | 42 | 23 | 15 |
| 55 | 54 | 52 | 49 | 47 | 47 | 46 | 40 | 41 | 48 | 55 | 55 | 51 | 38 | 23 | |
| 52 | 46 | 38 | 32 | 29 | 30 | 34 | 41 | 47 | 50 | 54 | 56 | 57 | 56 | 50 | 39 |
| 44 | 31 | 20 | 16 | 16 | 16 | 18 | 25 | 37 | 46 | 52 | 57 | 58 | 57 | 57 | 54 |
| 28 | 18 | 19 | 25 | 27 | 24 | 19 | 15 | 22 | 37 | 49 | 56 | 57 | 57 | 58 | 57 |
| 17 | 23 | 34 | 42 | 45 | 42 | 32 | 20 | 15 | 25 | 42 | 52 | 57 | 57 | 60 | 60 |
| 19 | 34 | 46 | 50 | 52 | 51 | 45 | 32 | 19 | 17 | 35 | 49 | 57 | 58 | 60 | 60 |
| 26 | 44 | 52 | 55 | 55 | 52 | 50 | 44 | 25 | 16 | 25 | 46 | 55 | 58 | 61 | 60 |
| 28 | 47 | 54 | 55 | 55 | 52 | 51 | 47 | 31 | 16 | 20 | 40 | 52 | 58 | 60 | 61 |
| 24 | 43 | 51 | 55 | 55 | 52 | 51 | 48 | 30 | 16 | 16 | 34 | 52 | 59 | 59 | 60 |
| 17 | 36 | 49 | 54 | 52 | 51 | 50 | 42 | 25 | 14 | 14 | 30 | 50 | 57 | 59 | 62 |

OPTICAL MOUSE WITH SHADE COMPENSATION AND ITS SHADE COMPENSATION METHOD

BACKGROUND OF THE INVENTION

1. Field of the Invention

The invention relates to a mouse device and, more particularly, to an optical mouse with shade compensation and its shade compensation method

2. Description of Related Art

A typical optical mouse has an image sensor consisting of plural image sensing elements. The sensor can sense two sequential images for motion detection. The image sensor is integrated into an integrated circuit (IC) to accordingly save cost. A transparent adhesive is coated on the IC, in order to protect the IC and the image sensor thereon and also allow the light passing through the transparent adhesive such that the image sensor can operate normally.

However, in the test step of an IC manufacturing, due to that every sensor may have different sensitivity, uneven adhesive or grain contamination, poor image sensitivity may be encountered, which further causes a decision mistake on motion detection of the optical mouse. Accordingly, the ICs having defective sensors are discarded in the IC test process, resulting in a poor IC yield.

Therefore, the prior manufacturing does not process partial image losses caused by minor defective sensors so as to have poor yield and performance. Therefore, it is desirable to provide an improved mouse to mitigate and/or obviate the aforementioned problems.

SUMMARY OF THE INVENTION

The object of the invention is to provide an optical mouse with shade compensation and its shade compensation method, which can increase IC yield in the optical mouse and avoid the decision mistake on motion detection of the optical mouse.

According to a feature of the invention, an optical mouse with shade compensation is provided. The optical mouse includes a light source, a sensor and a controller. The light source illuminates a sampling plane of a mouse. The sensor consists of a 2-dimensional array of sensing elements to capture an image from the sampling plane and temporarily store the image into a 2-dimensional array of pixels, each having a pixel value. The controller is connected to the sensor for adjusting the pixel values according to a predetermined table, thereby achieving a shade compensation for the sensors.

According to another feature of the invention, an optical mouse with shade compensation is provided. The optical mouse includes a light source, a sensor and a controller. The light source illuminates a sampling plane of a mouse. The sensor consists of a 2-dimensional array of sensing elements to capture an image from the sampling plane and temporarily store the image into a 2-dimensional array of pixels, each having a pixel value. The controller is connected to the sensor for adjusting the pixel values according to the pixels adjacent thereto, thereby achieving a shade compensation for the sensors.

According to a further feature of the invention, there is provided a shade compensation method for an optical mouse which has a sensor consisting of a 2-dimensional array of sensing elements to capture an image from a sampling plane and temporarily store the image into a 2-dimensional array of pixels, each having a value. The method includes the steps of: (A) using the sensor to capture at least one image from a predetermined sampling plane and accordingly obtain a 2-dimensional array of pixel values representing the image, and finding compensation factors proportional to sensitivities of the sensors; and (B) using the sensor to capture a current image from a sampling plane and accordingly obtain a current 2-dimensional array of pixels representing the current image, and multiplying the current array of pixel values by respective compensation factors to thus obtain a corrected 2-dimensional array of pixel values.

According to a further another feature of the invention, there is provided a shade compensation method for an optical mouse which has a sensor consisting of a 2-dimensional array of sensing elements to capture an image from a sampling plane and temporarily store the image into a 2-dimensional array of pixels, each having a pixel value. The method includes the steps of: (A) setting a compensation factor higher than an initial value of a typical compensation factor; (B) using the sensor to read the pixel values and multiply the compensation factor by a respective pixel value of the array to thus obtain a corrected pixel value; (C) replacing the respective pixel value with the corrected pixel value if the corrected pixel value is lower than a predetermined threshold, or otherwise replacing it with the threshold and further replacing the compensation factor with the threshold divided by the respective pixel value.

Other objects, advantages, and novel features of the invention will become more apparent from the following detailed description when taken in conjunction with the accompanying drawings.

BRIEF DESCRIPTION OF THE DRAWINGS

FIG. 5 is a schematic illustration of compensation factors of sensing elements according to the invention;

DETAILED DESCRIPTION OF THE PREFERRED EMBODIMENT

Figure 1:
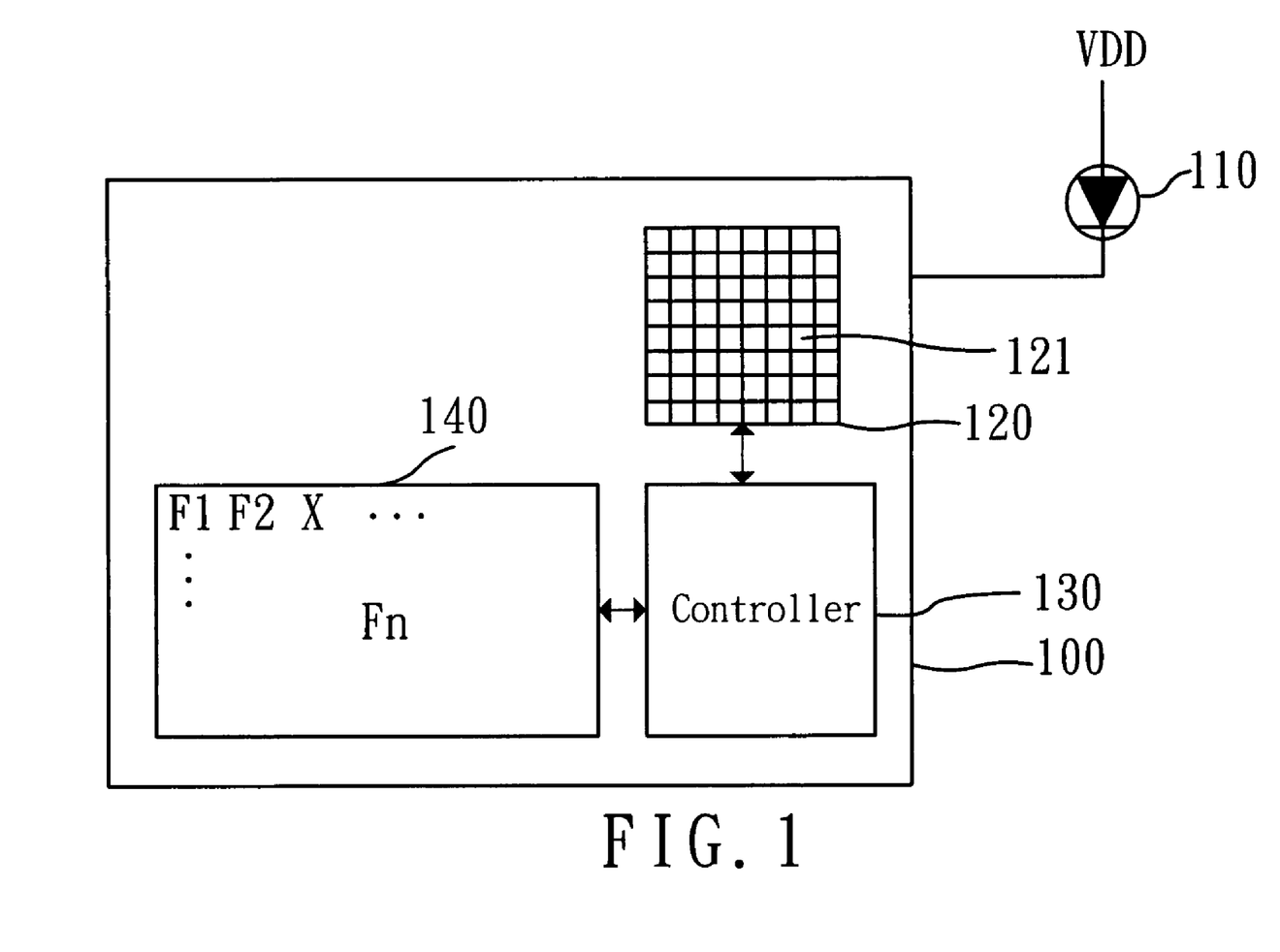
FIG. 1 is a block diagram of an optical mouse with shade compensation according to the invention.

FIG. 1 is a block diagram of an optical mouse with shade compensation according to the invention. In FIG. 1, the optical mouse includes a light source 110, a sensor 120 and a controller 130. The sensor 120 and the controller 130 can be integrated into an IC 100. As shown in FIG. 1, the light source 110 preferably is a light-emitted diode (LED). The LED 110 illuminates a sampling plane (not shown) of the optical mouse, and the LED 110 has a positive electrode connected to a high potential and a negative electrode connected to a pin (not shown) of the IC 100.

The sensor 120 consists of a 2-dimensional array of sensing elements 121 to capture an image from the sampling plane and temporarily store the image into a 2-dimensional array of pixel values. The controller 130 is connected to the sensor 120 for adjusting the pixel values according to a predetermined table 140, thereby achieving shade compensation for the sensors 121.

Figure 2:
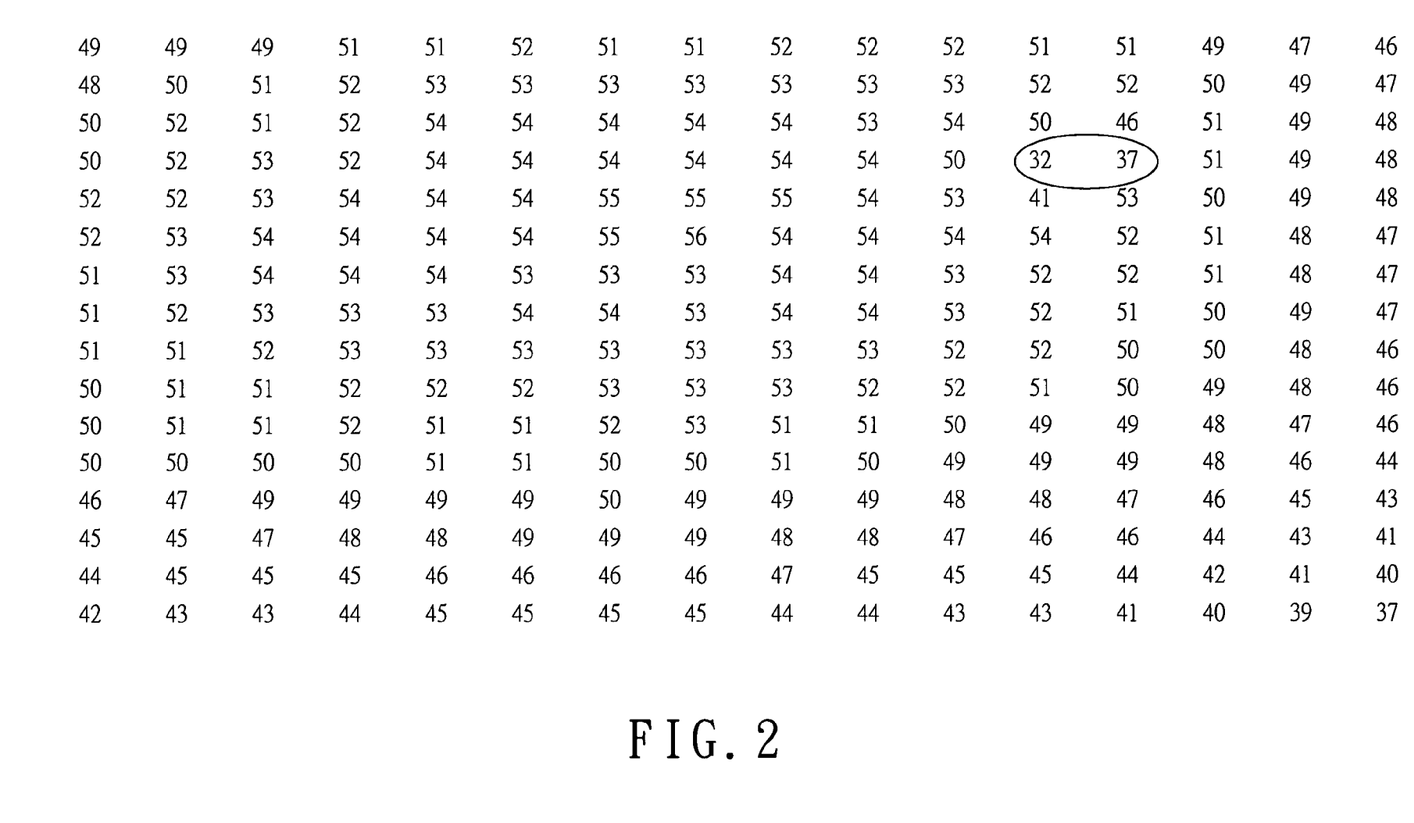
FIG. 2 is a schematic illustration of pixels after sensing elements sense a white compensation sheet according to the invention.

The predetermined table 140 stores compensation factors Fn of the sensing elements 121, where n is an integer to indicate a respective pixel index. The compensation factors can be computed offline. First, the sensing elements 121 sense a white compensation sheet to thus obtain the pixel values Wn shown in FIG. 2, where n is an integer to indicate a respective pixel index. In this embodiment, a 6-bit analog-to-digital converter (ADC) is used, which results in a pixel value of around 50 with respect to the white compensation sheet. Two pixel values as circled in FIG. 2 are much lower than those around the two pixel values. In this case, the two pixel values are regarded as defective. Next, the sensing elements 121 sense a black compensation sheet to thus obtain the pixel values Bn shown in FIG. 3, where n is an integer to indicate a respective pixel index, and in this case, a pixel value with respect to the black compensation sheet is about 2.

Figure 4:
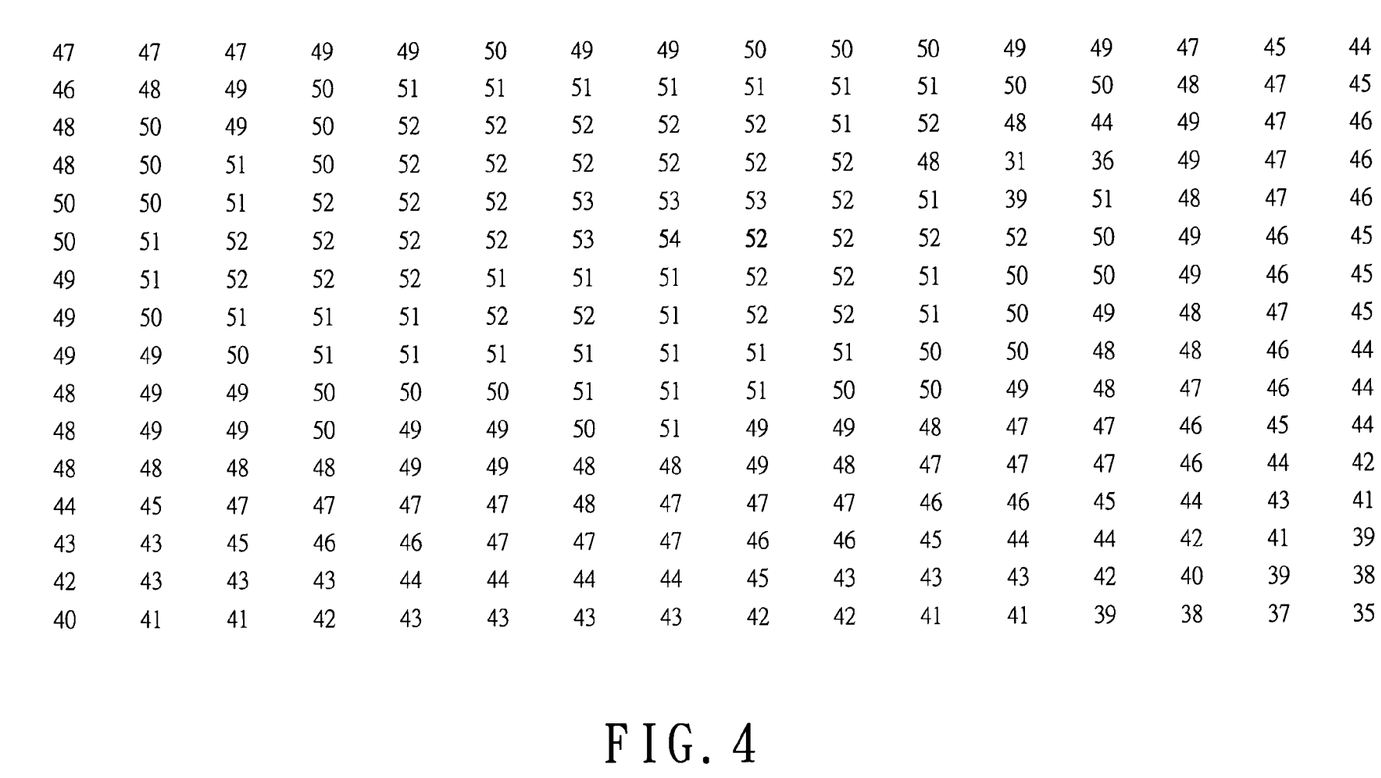
FIG. 4 is a schematic illustration of sensitivity indications of sensing elements according to the invention.

Upon respective Wn and Bn, as shown in FIG. 4, sensitivity indications (Wn-Bn) of the sensing elements 121 can be obtained. Since a pixel value with respect to the black compensation sheet is normally around 0, the sensitivity indications of the sensing elements 121 can be Wn or (Wn-B), where B is a constant. Next, the sensitivity indications are normalized to enhance pixel values captured by the corresponding defective sensing elements to a normal level. To achieve this, a value of M that can be the maximum (Wn-Bn) (in this case, 54) or any appropriate value is selected. Thus, for every sensing element 121, a respective compensation factor is represented by Fn=M/(a respective sensitivity indication)= M/(Wn-Bn). For the respective sensitivity indication as Wn or (Wn-B), the respective compensation factor Fn=M/Wn or M/(Wn-B). FIG. 5 is a schematic illustration of compensation factors Fn of the sensing elements 121. As shown in FIG. 5, two compensation factors Fn that are circled have values much higher than the surroundings for compensating image sensitivities of the defective sensing elements 121.

Figure 6:
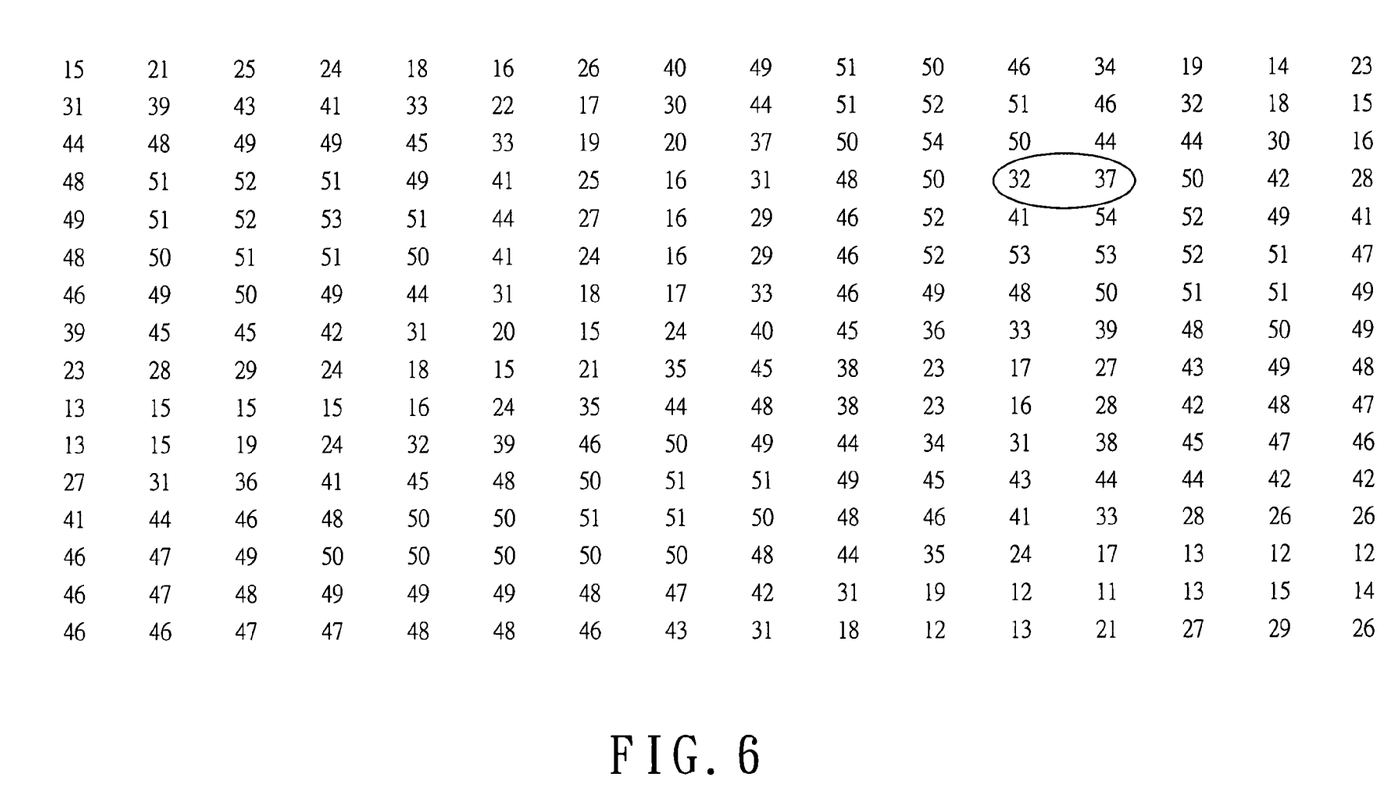
FIG. 6 is a schematic illustration of pixels representing an image captured by sensing elements according to the invention.
Figure 7:
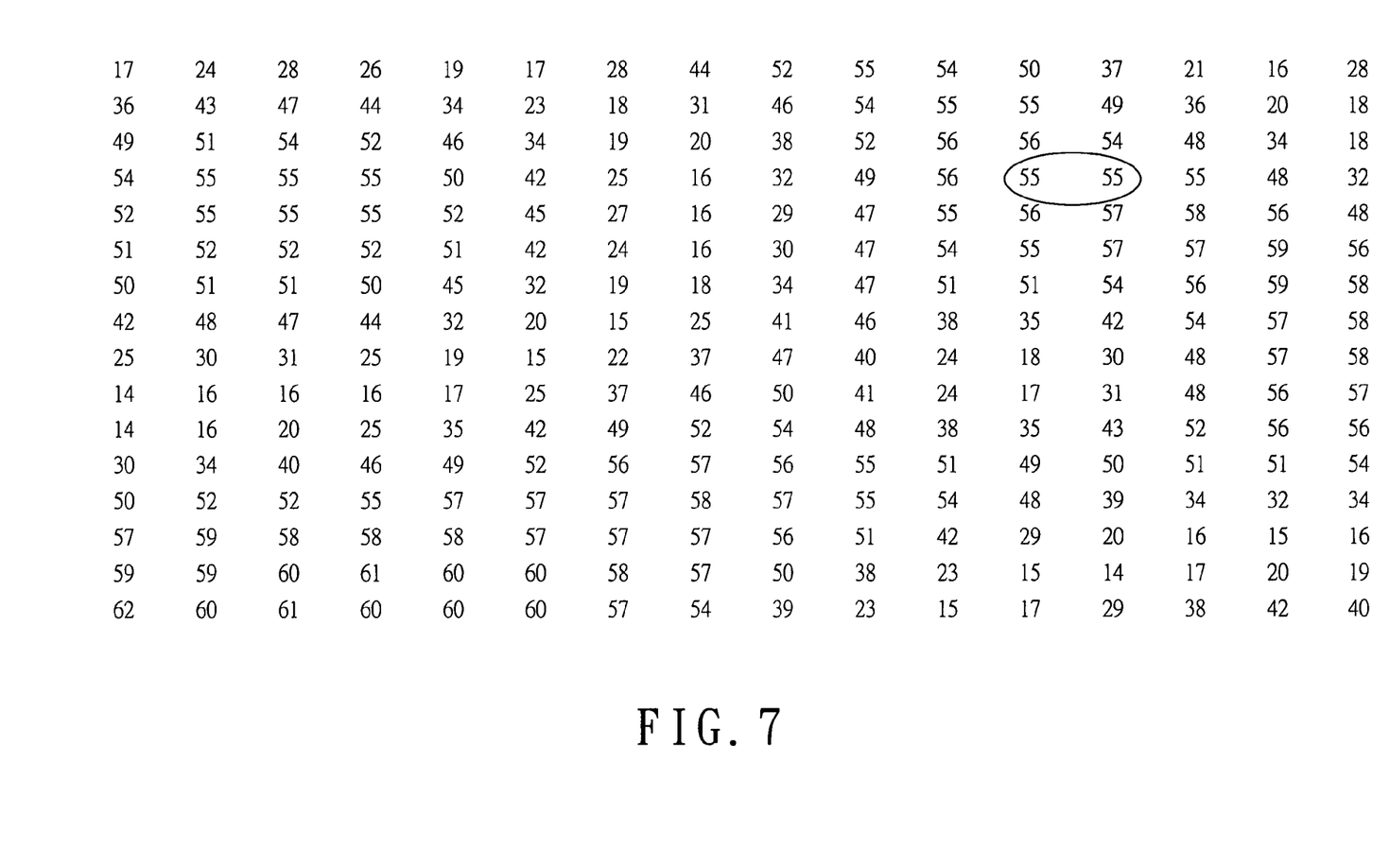
FIG. 7 is a schematic illustration of the image of FIG. 6 after compensation.

Subsequently, the pixel values are adjusted by multiplying the pixel values captured by the sensing elements via respective compensation factors. FIG. 6 is a schematic illustration of pixel values IMG1n representing an image to be processed, where n is an integer to indicate a respective pixel index. Pixel values that are circled are much lower than the surroundings because sensors 121 corresponding to the circled pixel values are defective. In this case, the invented compensation factors Fn are applied for compensation, as shown in FIG. 7. Accordingly, pixel values IMG2n(=IMG1n*Fn) after the last process are obtained. It is obvious that the image impairment originally shown in the right upper circle of FIG. 6 is compensated completely.

Figure 8:
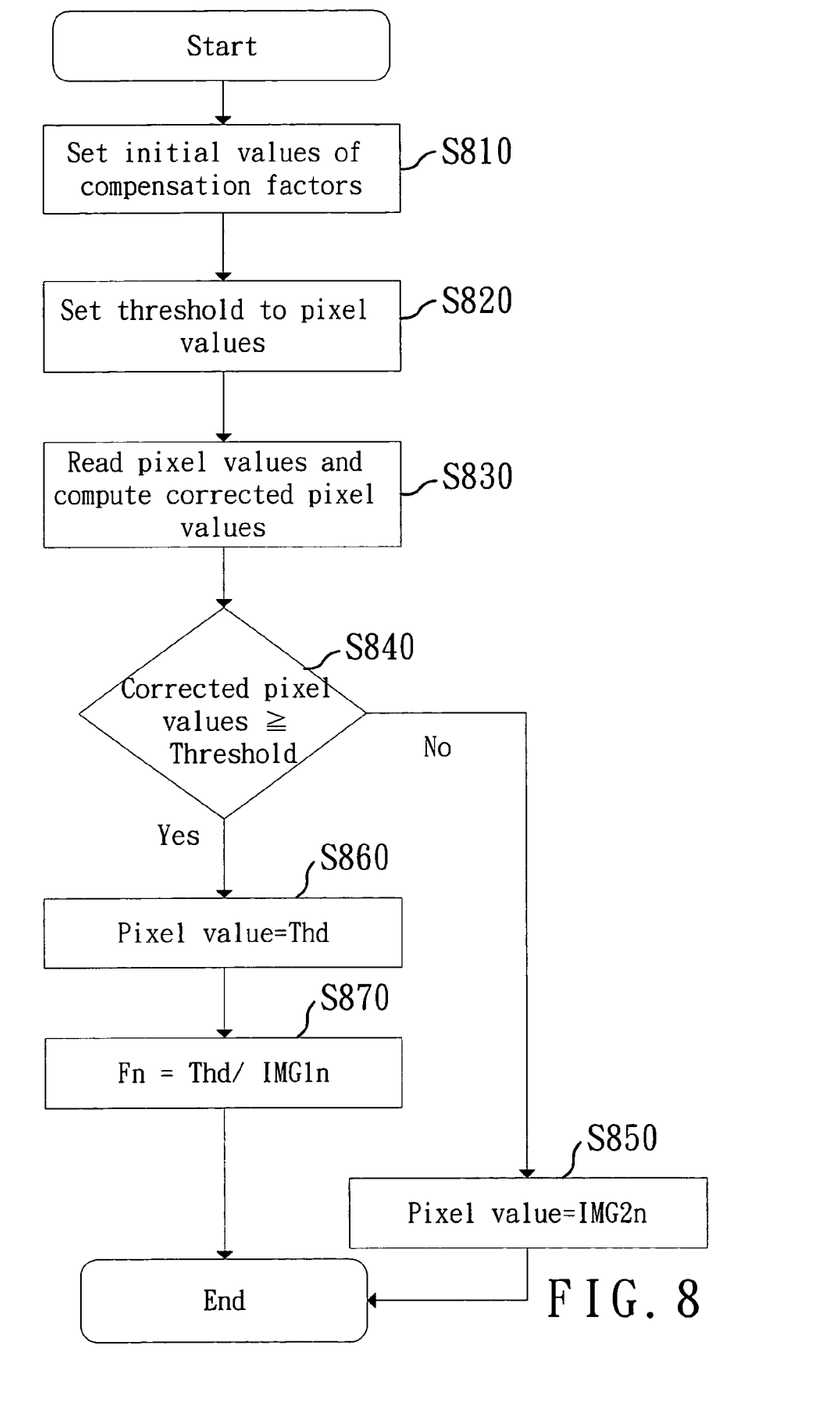
FIG. 8 is a flowchart of shade compensation for the optical mouse of FIG. 1 according to the invention.

The compensation factors Fn can be dynamically adjusted, as shown in the flowchart of FIG. 8. In step S810, initial values of the compensation factors are set. The initial values are higher than a predetermined typical value for downward adjustment to an appropriate value. Step S820 sets a threshold as a highest limit to all pixel values captured. Step S830 applies sensing elements to capture an image and read pixel values IMG1n thereof. The pixel values IMG1n are multiplied by respective compensation factors Fn in order to compute adjusted or corrected pixel values IMG2n(=IMG1n*Fn).

Step S840 determines if the corrected pixel values IMG2n are greater than or equal to the threshold Thd; if not, step 850 are executed to replace corresponding pixel values with the corrected pixels IMG2n; and if yes, step 860 is executed to replace the corresponding pixel values with the threshold Thd. In step S870, the compensation factor Fn is corrected to be the threshold Thd divided by the pixel values IMG1n captured by the sensing elements.

Referring again to FIGS. 1, 2 and 3, another embodiment of an optical mouse with shade compensation according to the invention is given by using the controller 140 to adjust the pixel values based on adjacent pixel values, thereby achieving shade compensation for the sensors.

Figure 3:
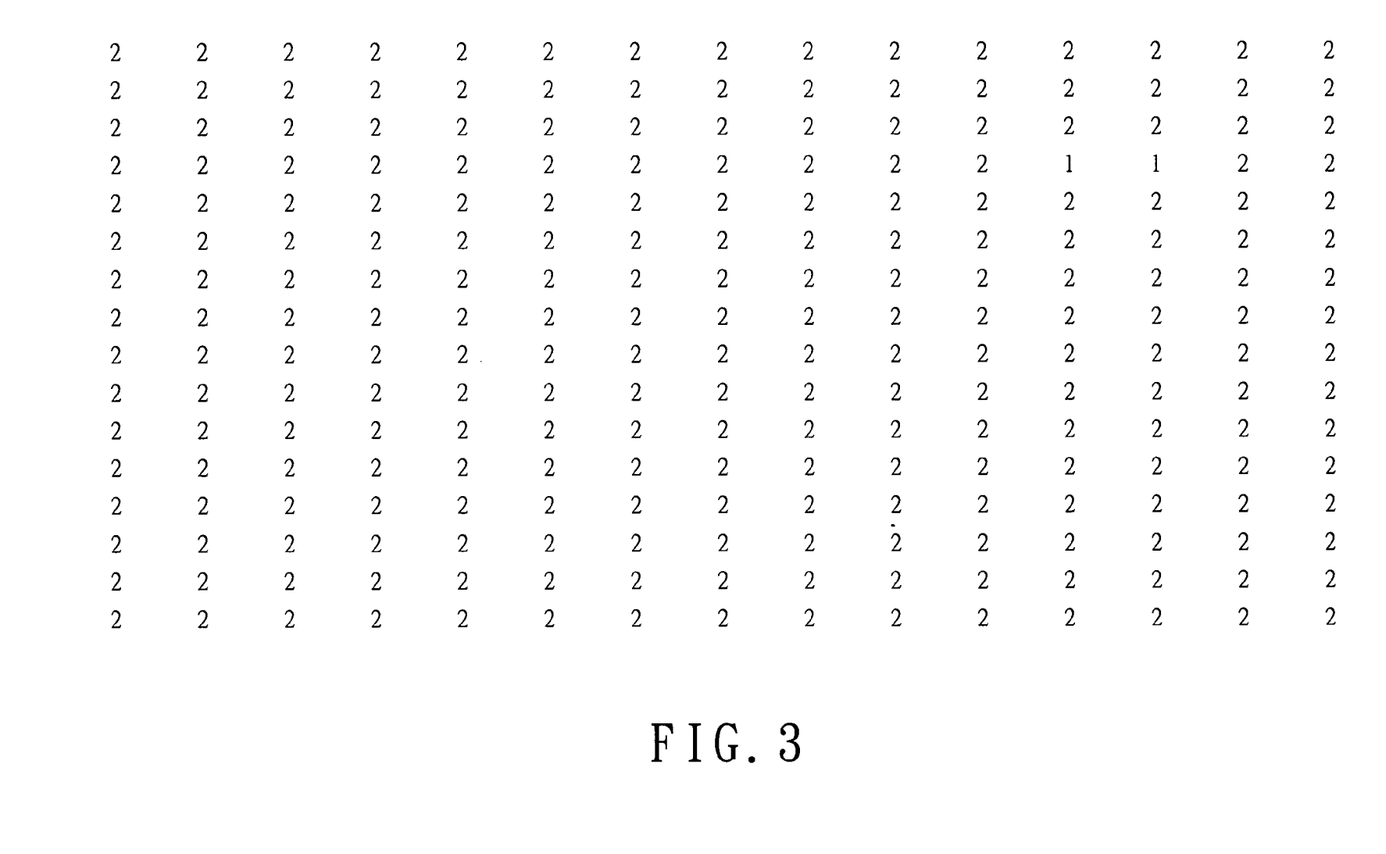
FIG. 3 is a schematic illustration of pixels after sensing elements sense a black compensation sheet according to the invention.

First, sensing elements 121 sense a white compensation sheet, and pixel value Wn sensed by each sensing element is shown in FIG. 2, where n is a pixel index. The two pixel values circled in FIG. 2 are much lower than the surroundings. In this case, the pixel values can be regarded as defective. Next, the sensing elements 121 sense a black compensation sheet, and pixel value Bn sensed by each sensor is shown in FIG. 3, where n is an integer to indicate a respective pixel index. In this case, a pixel value with respect to the black compensation sheet is about 2.

Upon respective Wn and Bn, as shown in FIG. 4, sensitivity indications (Wn-Bn) of the sensing elements 121 can be obtained. Since a pixel value with respect to the black compensation sheet is normally around 0, the sensitivity indications of the sensing elements 121 can be Wn or (Wn-B), where B is a constant.

Next, the sensing element 121 with sensitivity indications lower than a a specific value are recorded as defective. Accordingly, pixel values corresponding to the sensitivity indications are defective and compensated in accordance with the respective surrounding pixel values. For example, an average of pixel values captured by sensing elements 121 adjacent to the defective sensing element is regarded as the pixel value of the defective sensing element.

In view of the foregoing, it is known that the invention uses an offline-generated or dynamic-adjusted compensation table to compensate the pixel values captured by the defective sensing elements 121, thereby avoiding discarding the entire IC due to the minor defective sensing elements 121. Thus, the IC yield is increased and also the mistake decision at motion detection of an optical mouse is prevented. Furthermore, the invention uses a respective sensitivity indication of each sensing element 121 to compensate the pixel values captured by the defective sensing elements 121, thereby increasing the IC yield and avoiding the mistake decision at motion detection of an optical mouse.

Although the present invention has been explained in relation to its preferred embodiment, it is to be understood that many other possible modifications and variations can be made without departing from the spirit and scope of the invention as hereinafter claimed.

What is claimed is:

1. An optical mouse with shade compensation, comprising:
 a light source, which illuminates a sampling plane of a mouse;
 a sensitive extractor, which consists of a 2-dimensional array of sensors to capture an image from the sampling plane and temporarily store the image into a 2-dimensional array of pixel values; and
 a controller, which is connected to the sensitive extractor for adjusting values of the pixel values in accordance with a predetermined compensation table, thereby achieving desired shade compensation for the sensors;
 wherein the predetermined compensation table consists of a 2-dimensional array of compensation factors Fn, and the compensation factors Fn are proportional to sensitivities of the sensors and equal to M/(Wn−B), where Wn is a 2-dimensional array of pixel values obtained by sensing a white sampling plane, B is a predetermined value, M is the maximum difference between Wn and B, and n is an integer to indicate a pixel index.

2. The optical mouse as claimed in claims 1, wherein the pixels are adjusted by doing multiplication of the pixels and respective compensation factors Fn.

3. The optical mouse as claimed in claim 1, wherein the predetermined compensation table is generated offline.

4. The optical mouse as claimed in claim 1, wherein the compensation factors Fn are adjusted dynamically.

5. The optical mouse as claimed in claim 4, wherein the compensation factors Fn are set to an initial value higher than a predetermined standard value such that pixels extracted by corresponding sensors are multiplied by corresponding compensation factors, thereby computing a corrected pixel value for determining if the corrected pixel value is lower than a threshold; if yes, replacing the pixels extracted by the corresponding sensors with the corrected pixel value; otherwise, replacing with the threshold and correcting the corresponding compensation factors Fn by a result of the threshold divided by the pixels extracted by the corresponding sensors.

6. An optical mouse with shade compensation, comprising:
a light source, which illuminates a sampling plane of a mouse;
a sensitive extractor, which consists of a 2-dimensional array of sensors to extract an image from the sampling plane and temporarily store the image into a 2-dimensional array of pixel values; and
a controller, which is connected to the sensitive extractor for adjusting the pixel values in accordance with pixel values adjacent to the pixel values, thereby achieving desired shade compensation for the sensors;
wherein the controller adjusts special pixel values selected from the array of pixel values in accordance with pixel values adjacent to the special pixel values, and each sensitivity is proportional to $M/(Wn-B)$, where Wn is a 2-dimensional array of pixel values obtained by sensing a white sampling plane, B is a predetermined value, M is the maximum difference between Wn and B, and n is an integer to indicate a pixel index.

7. The optical mouse as claimed in claim 6, wherein the special pixel values that correspond to sensitivities of sensors lower than a predetermined pixel value are selected.

8. A shade compensation method for an optical mouse which has a sensitive extractor consisting of a 2-dimensional array of sensors to extract an image from a sampling plane and temporarily store the image into a 2-dimensional array of pixel values, the method comprising the steps of:
(A) using the sensitive extractor to extract at least one image from a predetermined sampling plane and accordingly obtain a 2-dimensional array of pixel values representing the image, and finding compensation factors proportional to sensitivities of the sensors; and
(B) using the sensitive extractor to extract a current image from a sampling plane and accordingly obtain a current 2-dimensional array of pixels representing the current image, and multiplying the current array of pixel values by respective compensation factors to thus obtain a corrected 2-dimensional array of pixel values,
wherein in step (A), the compensation factors equal to $Fn=M/(Wn-B')$, where Wn is a 2-dimensional array of pixel values obtained by sensing a white sampling plane, B is a predetermined value, M is the maximum difference between Wn and B, and n is an integer to indicate a pixel index.

9. A shade compensation method for an optical mouse which has a sensitive extractor consisting of a 2-dimensional array of sensors to extract an image from a sampling plane and temporarily store the image into a 2-dimensional array of pixel values, the method comprising the steps of:
(A) setting a compensation factor higher than an initial value of a typical compensation factor;
(B) using the sensitive extractor to read the pixel values and multiply the compensation factor by a respective pixel value of the array to thus obtain a corrected pixel value; and
(C) replacing the respective pixel value with the corrected pixel value if the corrected pixel value is lower than a predetermined threshold, otherwise replacing the respective pixel value with the threshold and further replacing the compensation factor with a result of the threshold divided by the respective pixel value.

10. An optical mouse with shade compensation, comprising:
a light source, which illuminates a sampling plane of a mouse;
a sensitive extractor, which consists of a 2-dimensional array of sensors to capture an image from the sampling plane and temporarily store the image into a 2-dimensional array of pixel values; and
a controller, which is connected to the sensitive extractor for adjusting values of the pixel values in accordance with a predetermined compensation table, thereby achieving desired shade compensation for the sensors;
wherein the predetermined compensation table consists of a 2-dimensional array of compensation factors Fn, and the compensation factors Fn are proportional to sensitivities of the sensors and equal to $M/(Wn-Bn)$, where Wn is a 2-dimensional array of pixel values obtained by sensing a white sampling plane, Bn is a 2-dimensional array of pixel values obtained by sensing a black sampling plane, M is a predetermined value, and n is an integer to indicate a pixel index.

11. The optical mouse as claimed in claim 10, wherein the pixels are adjusted by doing multiplication of the pixels and respective compensation factors Fn.

12. The optical mouse as claimed in claim 10, wherein the predetermined compensation table is generated offline.

13. The optical mouse as claimed in claim 10, wherein the compensation factors Fn are adjusted dynamically.

14. The optical mouse as claimed in claim 13, wherein the compensation factors Fn are set to an initial value higher than a predetermined standard value such that pixels extracted by corresponding sensors are multiplied by corresponding compensation factors, thereby computing a corrected pixel value for determining if the corrected pixel value is lower than a threshold; if yes, replacing the pixels extracted by the corresponding sensors with the corrected pixel value; otherwise, replacing with the threshold and correcting the corresponding compensation factors Fn by a result of the threshold divided by the pixels extracted by the corresponding sensors.

15. An optical mouse with shade compensation, comprising:
a light source, which illuminates a sampling plane of a mouse;
a sensitive extractor, which consists of a 2-dimensional array of sensors to capture an image from the sampling plane and temporarily store the image into a 2-dimensional array of pixel values; and
a controller, which is connected to the sensitive extractor for adjusting values of the pixel values in accordance with a predetermined compensation table, thereby achieving desired shade compensation for the sensors;
wherein the predetermined compensation table consists of a 2-dimensional array of compensation factors Fn, and the compensation factors Fn are proportional to sensitivities of the sensors and equal to M/(Wn−Bn), where Wn is a 2-dimensional array of pixel values obtained by sensing a white sampling plane, Bn is a 2-dimensional array of pixel values obtained by sensing a black sampling plane, M is the maximum difference between Wn and Bn, and n is an integer to indicate a pixel index.

16. The optical mouse as claimed in claim 15, wherein the pixels are adjusted by doing multiplication of the pixels and respective compensation factors Fn.

17. The optical mouse as claimed in claim 15, wherein the predetermined compensation table is generated offline.

18. The optical mouse as claimed in claim 15, wherein the compensation factors Fn are adjusted dynamically.

19. The optical mouse as claimed in claim 18, wherein the compensation factors Fn are set to an initial value higher than a predetermined standard value such that pixels extracted by corresponding sensors are multiplied by corresponding compensation factors, thereby computing a corrected pixel value for determining if the corrected pixel value is lower than a threshold; if yes, replacing the pixels extracted by the corresponding sensors with the corrected pixel value; otherwise, replacing with the threshold and correcting the corresponding compensation factors Fn by a result of the threshold divided by the pixels extracted by the corresponding sensors.

20. An optical mouse with shade compensation, comprising:
   a light source, which illuminates a sampling plane of a mouse;
   a sensitive extractor, which consists of a 2-dimensional array of sensors to extract an image from the sampling plane and temporarily store the image into a 2-dimensional array of pixel values; and
   a controller, which is connected to the sensitive extractor for adjusting the pixel values in accordance with pixel values adjacent to the pixel values, thereby achieving desired shade compensation for the sensors;
   wherein the controller adjusts special pixel values selected from the array of pixel values in accordance with pixel values adjacent to the special pixel values, and each sensitivity is proporational to M/(Wn−Bn), where Wn is a 2-dimensional array of pixel values obtained by sensing a white sampling plane, Bn is a 2-dimensional array of pixel values obtained by sensing a black sampling plane, M is a predetermined value, and n is an integer to indicate a pixel index.

21. An optical mouse with shade compensation, comprising:
   a light source, which illuminates a sampling plane of a mouse;
   a sensitive extractor, which consists of a 2-dimensional array of sensors to extract an image from the sampling plane and temporarily store the image into a 2-dimensional array of pixel values; and
   a controller, which is connected to the sensitive extractor for adjusting the pixel values in accordance with pixel values adjacent to the pixel values, thereby achieving desired shade compensation for the sensors;
   wherein the controller adjusts special pixel values selected from the array of pixel values in accordance with pixel values adjacent to the special pixel values, and each sensitivity is proportional to M/(Wn−Bn), where Wn is a 2-dimensional array of pixel values obtained by sensing a white sampling plane, Bn is a 2-dimensional array of pixel values obtained by sensing a black sampling plane, M is the maximum difference between Wn and Bn, and n is an integer to indicate a pixel index.

22. A shade compensation method for an optical mouse which has a sensitive extractor consisting of a 2-dimensional array of sensors to extract an image from a sampling plane and temporarily store the image into a 2-dimensional array of pixel values, the method comprising the steps of:
   (A) using the sensitive extractor to extract at least one image from a predetermined sampling plane and accordingly obtain a 2-dimensional array of pixel values representing the image, and finding compensation factors proportional to sensitivities of the sensors; and
   (B) using the sensitive extractor to extract a current image from a sampling plane and accordingly obtain a current 2-dimensional array of pixels representing the current image, and multiplying the current array of pixel values by respective compensation factors to thus obtain a corrected 2-dimensional array of pixel values,
   wherein in step (A), the compensation factors equal to Fn=M/(Wn−Bn), where Wn is a 2-dimensional array of pixel values obtained by sensing a white sampling plane, Bn is a 2-dimensional array of pixel values obtained by sensing a black sampling plane, M is a predetermined value, and n is an integer to indicate a pixel index.

23. A shade compensation method for an optical mouse which has a sensitive extractor consisting of a 2-dimensional array of sensors to extract an image from a sampling plane and temporarily store the image into a 2-dimensional array of pixel values, the method comprising the steps of:
   (A) using the sensitive extractor to extract at least one image from a predetermined sampling plane and accordingly obtain a 2-dimensional array of pixel values representing the image, and finding compensation factors proportional to sensitivities of the sensors; and
   (B) using the sensitive extractor to extract a current image from a sampling plane and accordingly obtain a current 2-dimensional array of pixels representing the current image, and multiplying the current array of pixel values by respective compensation factors to thus obtain a corrected 2-dimensional array of pixel values,
   wherein the compensation factors equal to Fn=M/(Wn−Bn), where Wn is a 2-dimensional array of pixel values obtained by sensing a white sampling plane, Bn is a 2-dimensional array of pixel values obtained by sensing a black sampling plane, M is the maximum difference between Wn and Bn, and n is an integer to indicate a pixel index.

* * * * *